(12) United States Patent
Kasai (10) Patent No.: US 8,932,459 B2
(45) Date of Patent: Jan. 13, 2015

(54) WORKING FLUID FILTERING DEVICE FOR ELECTRICAL DISCHARGE MACHINE

(75) Inventor: Hirotsugu Kasai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 58 days.

(21) Appl. No.: 13/613,162

(22) Filed: Sep. 13, 2012

(65) Prior Publication Data

US 2013/0161242 A1  Jun. 27, 2013

(30) Foreign Application Priority Data

Dec. 21, 2011 (JP) .................. 2011-280484

(51) Int. Cl.
- *B01D 35/00* (2006.01)
- *B01D 33/04* (2006.01)
- *B23K 9/00* (2006.01)
- *B01D 33/46* (2006.01)
- *B01D 33/50* (2006.01)

(52) U.S. Cl.
CPC .............. *B01D 33/463* (2013.01); *B01D 33/50* (2013.01); *B01D 2201/081* (2013.01)
USPC ............... 210/85; 210/400; 210/398; 210/90; 210/409; 219/69.1; 219/69.14

(58) Field of Classification Search
CPC ...... B01D 33/15; B01D 33/463; B01D 33/04; B01D 33/50; B01D 35/1435; B01D 2201/081; B24B 57/02
See application file for complete search history.

(56) References Cited

U.S. PATENT DOCUMENTS

| | | | |
|---|---|---|---|
| 3,678,240 A * | 7/1972 | Dietrick | 219/69.14 |
| 4,553,558 A * | 11/1985 | Hamazaki et al. | 134/181 |
| 4,707,260 A * | 11/1987 | Nagayama et al. | 210/386 |
| 4,944,870 A | 7/1990 | Yagishita et al. | |
| 5,069,755 A * | 12/1991 | Durr et al. | 202/169 |
| 5,320,753 A * | 6/1994 | Keillor et al. | 210/398 |
| 5,836,136 A * | 11/1998 | Highberger | 53/75 |
| 6,029,495 A | 2/2000 | Munetaka | |
| 6,402,822 B1 * | 6/2002 | Najm | 96/429 |

(Continued)

FOREIGN PATENT DOCUMENTS

| | | |
|---|---|---|
| DE | 2816378 A1 | 10/1979 |
| EP | 2497594 A1 | 9/2012 |

(Continued)

OTHER PUBLICATIONS

Japanese Office Action for U.S. Appl. No. 13/613,162 mailed Nov. 27, 2012.

(Continued)

*Primary Examiner* — Nam Nguyen
*Assistant Examiner* — Richard Gurtowski
(74) *Attorney, Agent, or Firm* — Lowe Hauptman & Ham, LLP (57) ABSTRACT

A seal is brought into contact with a filter media, a filter pump is operated to start filtration, and a signal from a pressure sensor is received. When a predetermined value is exceeded by the signal from the pressure sensor, the filter pump is stopped, the seal is separated from the filter media, and take-up of one section of the filter by a filter collection roll is started. In finishing filter supply from a filter supply roll, drive of a motor is stopped, and an alarm signal is transmitted. If the supply is not to be finished, one section of the filter is taken up by the filter collection roll, and the next stage of filtration is entered.

6 Claims, 7 Drawing Sheets

(56) References Cited

U.S. PATENT DOCUMENTS

| | | | | |
|---|---|---|---|---|
| 2001/0020391 | A1* | 9/2001 | Moser | 73/627 |
| 2007/0012188 | A1* | 1/2007 | Tandon et al. | 95/273 |
| 2012/0228201 | A1 | 9/2012 | Kasai et al. | |

FOREIGN PATENT DOCUMENTS

| GB | 2066094 A | 7/1981 |
|---|---|---|
| JP | 61097010 A | 5/1986 |
| JP | 61220714 A | 10/1986 |
| JP | 62-22025 U | 2/1987 |
| JP | 2-30433 A | 1/1990 |
| JP | 7132203 A | 5/1995 |
| JP | 9173720 A | 7/1997 |
| JP | 10318803 A | 12/1998 |
| JP | 11290616 A | 10/1999 |
| JP | 2007117803 A | 5/2007 |
| JP | 2010085418 A | 4/2010 |

OTHER PUBLICATIONS

Extended European Search Report corresponding to EP 12184234.8, dated Jan. 17, 2013.

* cited by examiner

WORKING FLUID FILTERING DEVICE FOR ELECTRICAL DISCHARGE MACHINE

RELATED APPLICATIONS

The present application is claims priority from, Japanese Application Number 2011-280484, filed Dec. 21, 2011, the disclosure of which is hereby incorporated by reference herein in its entirety.

BACKGROUND OF THE INVENTION

1. Field of the Invention

The present invention relates to a working fluid filtering device for an electrical discharge machine, in which fine metal sludge of a workpiece discharged during machining is filtered by a rolled filter media.

2. Description of the Related Art

To filter a working fluid in an electrical discharge machine, such as a wire-cut electrical discharge machine, filters have become widely used in which a filter media, such as synthetic fiber, cellulose, etc., is folded and packed into a cylindrical metal or plastic container. A filter, as stated herein, is a combination of a filter media and a filter vessel that contains the media.

As the filter continues to filter sludge discharged during machining, the sludge accumulates in the filter media. In a certain time, the sludge causes clogging and reduces the filtering capability. The filtering capability is a filter flow rate.

The filter flow rate of the clogged filter can be increased by increasing the pressure during filtration. Since the filter media and the filter vessel are limited in strength, however, the filtration pressure cannot be increased beyond the limited strength. In general, the timing for the replacement of the filter corresponds to the point in time when the strength limit is reached by the filtration pressure.

Japanese Patent Application Laid-Open No. 2-30433 discloses a technique in which a rolled filter media is used for filtration and a collection roller is driven to collect a used filter when the filter is clogged, thereby increasing the internal pressure of a filter tank. According to this technique, however, the filter media is interposed between the filter tank and a bottom board as it moves. Thus, there is a problem that contact parts of the filter media and a seal easily rub against each other and wear out, so that a working fluid is liable to leak from a sealed portion after continued use. Due to its possible wear, therefore, the filter media cannot be backwashed for repeated use. Since there is no provision for washing the filter, moreover, the collected filter cannot be reused.

Japanese Utility Model Application Laid-Open No. 62-022025 discloses a sub-filter technology intended to extend the life of a filter element in a main filtering device.

According to the prior art described above, the filter media is interposed between the filter tank and the bottom board as it moves. To prevent the contact parts of the filter media and the seal from rubbing against each other and wearing out, therefore, it is not advisable to increase pressure on the filter media. Thus, filter media with low filtration accuracy cannot be used in this field.

SUMMARY OF THE INVENTION

Accordingly, in consideration of the above problems of the prior art, the object of the present invention is to provide a working fluid filtering device for an electrical discharge machine, capable of filtering fine metal sludge of a workpiece discharged during machining by a rolled filter media and moving the rolled filter media without damaging either the working fluid filtering device or the filter media.

A working fluid filtering device for an electrical discharge machine according to the present invention includes a working tank comprising therein an electric discharge machining unit in which a workpiece is electrical-discharge-machined by an electrode, a contaminated fluid tank in which a working fluid from the working tank is collected and pooled, and a filter tank formed with an opening at a bottom portion thereof. A filter is brought into contact with the bottom portion of the filter tank and the working fluid from the contaminated fluid tank is filled into a space defined by the filter tank and the filter and is filtered. The working fluid filtering device comprises: a filter supply roll actuator configured to rotate a filter supply roll which is a rolled form of the filter for working fluid filtration; a filter collection roll actuator configured to rotate a filter collection roll which collects the filter; a movement amount detection unit configured to detect an amount of movement of the filter; an actuator for close contact configured to bring a seal disposed on the filter tank into close contact with the filter and separate the seal from the filter; a pressure detection unit configured to detect a pressure of the working fluid in the filter tank; and a control unit configured to perform control such that the actuator for close contact is driven to bring the seal into close contact with the filter, the working fluid is filtered with the filter tank being sealed, and when a predetermined value is exceeded by the pressure of the working fluid detected by the pressure detection unit, the actuator for close contact is driven to separate the seal and the filter from each other, and the filter supply roll actuator and the filter collection roll actuator are synchronously driven to move the filter a predetermined distance.

The working fluid filtering device for an electrical discharge machine may further comprises a nozzle configured to wash the filter disposed upstream or downstream relative to the filter tank; and the control unit may be configured to perform control such that the filter supply roll actuator and the filter collection roll actuator are synchronously driven to move the filter a predetermined distance so that the filter is washed.

The working fluid filtering device may further comprise a time integration unit configured to integrate a time required to bring the seal into close contact with the filter by means of the actuator for close contact, and when a predetermined time is exceeded by the time integrated by the time integration unit, a warning alarm indicative of the life limit of the seal may be issued.

The working fluid filtering device may further comprise a frequency integration unit configured to integrate a frequency required to bring the seal into close contact with the filter by means of the actuator for close contact, and when a predetermined frequency is exceeded by the frequency integrated by the frequency integration unit, a warning alarm indicative of the life limit of the seal may be issued.

According to the present invention, there can be provided a working fluid filtering device for an electrical discharge machine, capable of filtering fine metal sludge of a workpiece discharged during machining by a rolled filter media and moving the rolled filter media without damaging either the working fluid filtering device or the filter media.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

An outline of embodiments of the present invention will be described first.

While a filter media is being moved and collected, a sealing member attached to a filter tank is kept apart from the filter media. Thus, wear of contact parts of the sealing member and the filter media can be avoided, so that leakage of a working fluid from the contact parts can be prevented when filtration is restarted. Since an actuator, such as a cylinder, is used to bring the sealing member into close contact with the filter media, a pressure to be applied to the filter media can be increased. Therefore, a filter media of low filtration accuracy is available for the purpose. This filter media can be used for a filter capable of filtering even fine sludge, as well as for a sub-filter that can filter only coarse sludge. Further, the life limit of the sealing member (i.e., time to replace a seal) is determined based on the frequency of close contact of the sealing member with the filter media or integration time (integrated close contact time).

According to one embodiment of a working fluid filtering device of the present invention, moreover, the filter media is moved to a tank (or position) separate from the filter tank as it is backwashed. The amount of movement of the filter media is measured by an encoder attached to a roller that is in close contact with the filter media. Sludge removed by the backwashing is not returned to a working fluid tank of an electrical discharge machine, so that it is unnecessary to abandon the working fluid and replace it with a fresh one after each backwashing process. When a pressure that requires replacement of the filter media is reached, washing is performed according to a signal from a pressure sensor or a filter media replacement signal from a pressure switch, whereby backwashing can be efficiently performed. Backwashing is repeated a predetermined number of times (experimental value that determines the expiration of the life). When the predetermined number is reached by the frequency of backwashing, it is determined that the life of the filter media has expired, that is, the filter media should be replaced with a new one.

The one embodiment of the working fluid filtering device for an electrical discharge machine according to the present invention will be described with reference to FIG. 1.

To machine a workpiece in a working tank 2 disposed on a mechanical section 1, in a wire-cut electrical discharge machine, a wire electrode supplied from a wire bobbin is run through an upper wire guide and passed through a workpiece machining area. Thereafter, the wire electrode is run through a lower wire guide and taken up by a wire take-up unit. In FIG. 1, reference numeral 5 denotes a combination of the upper and lower wire guides. Thus, a predetermined tension is applied to the running wire electrode, voltage is applied between the wire electrode and the workpiece, and the workpiece is machined by electrical discharge machining. The workpiece is machined in such a manner that the working tank 2 is filled with the working fluid and voltage is applied (to an electrode gap) between the wire electrode and the workpiece to cause electrical discharge in the electrode gap. The wire-cut electrical discharge machine is controlled by a controller (not shown).

The contaminated working fluid used in the working tank 2 accumulates in a contaminated fluid tank 3. The working fluid contaminated by sludge and the like accumulated in the contaminated fluid tank 3 is drawn up by a filter pump P1 and introduced into a container that accommodates a second filter F2. Then, the working fluid filtered by the second filter F2 is introduced into a clean fluid tank 4. The filtered working fluid in the clean fluid tank 4 is delivered to the upper and lower guides 5 by a working fluid circulation pump P3. To keep the temperature of the working fluid in the clean fluid tank 4 constant, moreover, the working fluid is drawn up from the clean fluid tank 4 by a circulation pump P4 and introduced into a cooling device 24. The working fluid cooled in the cooling device 24 is returned again to the clean fluid tank 4.

Figure 1:
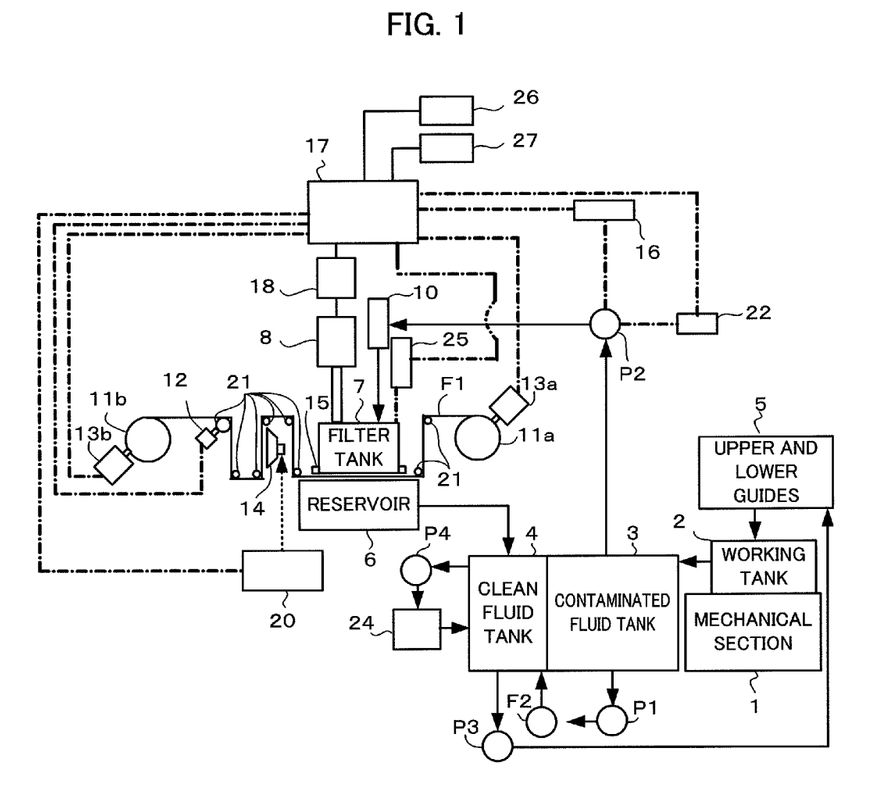
FIG. 1 is a diagram illustrating a first embodiment of a working fluid filtering device for an electrical discharge machine according to the present invention.

In FIG. 1, reference symbol F1 designates a first filter in the form of a rolled sheet, and reference numerals 11a, 21 and 11b denote a filter supply roll, a plurality of sets of guide rollers, and a filter collection roll, respectively. The guide rollers 21 are arranged on a movement path to guide the first filter F1. The filter collection roll 11b serves to collect the first filter F1 delivered from the filter supply roll 11a. One and the other end portions of the first filter F1 are removably attached to core members of the filter supply and collection rolls 11a and 11b, respectively. The filter supply roll 11a is connected to a filter supply roll motor 13a, and the filter collection roll 11b is connected to a filter collection roll motor 13b. Reference numeral 12 denotes an encoder for measuring the amount of movement of the first filter F1.

In FIG. 1, moreover, reference numeral 7, 6 and 15 denote a filter tank, reservoir, and seal, respectively. The seal 15 is disposed at a passage port for the first filter F1 on the bottom side of the filter tank 7. A lid is disposed on the upper part of the filter tank 7, and a bottom board (not shown) with a plurality of apertures is disposed at the lower part where it supports the first filter F1. A space surrounded by the filter tank 7 and the first filter F1 is closed. The contaminated fluid in the contaminated fluid tank 3 is drawn up by operating a rolled filter pump P2 and introduced into the filter tank 7 through a constant-flow valve 10.

The internal pressure of the filter tank 7 increases as the first filter F1 at the bottom of the filter tank 7 is contaminated and clogged. As the gravity and the internal pressure of the filter tank 7 increase, the working fluid in the filter tank 7 is filtered by the first filter F1 and flows from the filter tank 7 into the reservoir 6. Sludge that has been contained in the unfiltered working fluid adheres to the first filter F1. The filtered working fluid in the reservoir 6 is introduced into the clean fluid tank 4. The working fluid is delivered from the reservoir 6 to the clean fluid tank 4 by a pump (not shown) or natural gravitational flow.

Reference numeral 22 denotes an inverter configured to drive the rolled filter pump P2. The filter pump P2 is stopped by means of an electromagnetic switch (magnet contactor) 16. The electromagnetic switch 16 is a combination of a contactor for on-off control of an electrical circuit and a thermal relay for motor overload protection.

A control unit 17 is a device for controlling the entire working fluid filtering device, and comprises a processor (CPU), memory, input-output interface, and indicator for indicating the need of replacement of the first filter F1 (none of which is shown). The memory includes areas for individually storing a number of usage n of the first filter, use direction flag Dir, and number of usage limit nlim of the first filter. The number of usage, use direction flag, and limit number of uses will be described later. The control unit 17 may be either an independent controller or an incorporated function of the controller of the electrical discharge machine.

A backwashing nozzle 14 for backwashing the first filter F1 is disposed in a predetermined position between the filter collection roll 11b and the outlet side of the reservoir 6 and the filter tank 7. Reference numeral 20 denotes a washing fluid supplier, which supplies the backwashing nozzle 14 with a washing fluid used to backwash the first filter F1. A chemical agent may be used in place of the backwashing nozzle 14 used to backwash the first filter.

Figure 5:
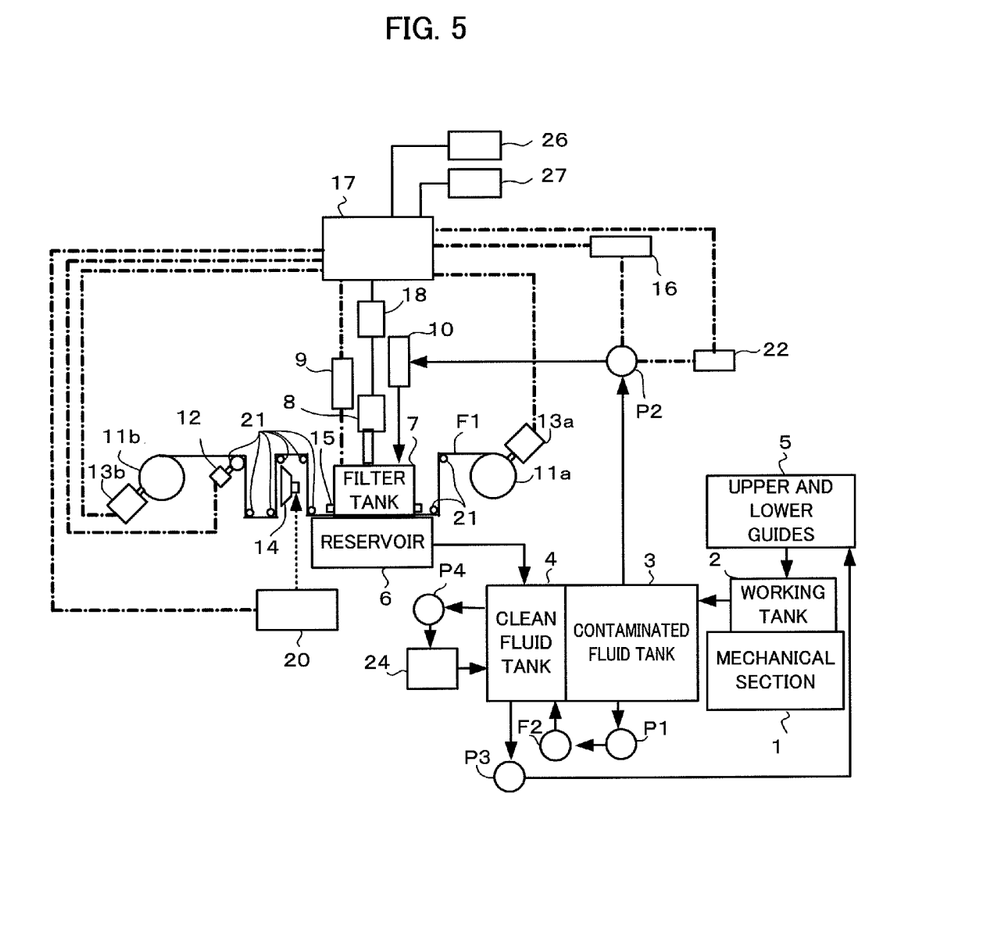
FIG. 5 is a diagram illustrating a second embodiment of the working fluid filtering device for an electrical discharge machine, which uses a pressure switch in place of a pressure sensor in the working fluid filtering device of FIG. 1.

Reference numeral 25 denotes a pressure sensor. The internal pressure of the filter tank 7 increases as the first filter F1 is contaminated and clogged. The internal pressure of the filter tank 7 is detected by the pressure sensor 25. This is done to determine the filtration limit of the first filter F1 by the working fluid. A pressure signal indicative of the internal pressure of the filter tank 7 detected by the pressure sensor 25 is input to the control unit 17. A pressure switch 9 (see FIG. 5) may be used in place of the pressure sensor 25. The pressure switch 9 transmits a signal to the control unit 17 when a predetermined pressure is reached.

When the internal pressure of the filter tank 7 detected by the pressure sensor 25 reaches a certain or predetermined pressure, the rolled filter pump P2 is stopped in response to a command from the control unit 17. This is done in order to prevent the working fluid from splashing and leaking out when the seal 15 is disengaged from the first filter F1. Then, a cylinder 8 is driven to lift the filter tank 7 so that the seal 15 is separated from the first filter F1. This is done in order to prevent the seal 15 and the first filter F1 from being worn by contacting each other. Then, the filter collection roll 11b is rotated by the filter collection roll motor 13b to move the first filter F1. By doing this, a filtering portion of the first filter F1 can be replaced with the filter surface of an unused portion when it reaches the filtration limit. Then, the cylinder 8 is driven to lower the filter tank 7 so that the seal 15 closely contacts the first filter F1, and the rolled filter pump P2 is operated to restart filtration.

The following is a description of a method of specifying the service life of the seal 15.

An integrator 26 and/or a counter 27 may be connected to the control unit 17 so that the frequency of close contact of the seal 15 with the first filter F1 can be counted by the counter 27 or the close contact time can be measured by the integrator 26. If this is done, the life limit of the seal 15 can be detected and a warning alarm can be issued when a predetermined frequency or time is reached. Either or both of the integrator 26 and the counter 27 may be used.

Further, the filter collection roll 11b is rotated by the filter collection roll motor 13b to move the first filter F1 to the place where the first filter F1 is backwashed, that is, where the backwashing nozzle 14 is disposed. That part of the first filter F1 used to filter the working fluid in the filter tank 7 is backwashed by the backwashing nozzle 14. The amount of movement of the first filter F1 can be measured by the encoder 12.

The following is a description of a method of detecting the attainment of a limit by the delivery of the first filter F1 from the filter supply or collection roll 11a or 11b. Here it is assumed that the opposite end portions of the first filter F1 are secured individually to the respective core members of the filter supply and collection rolls 11a and 11b.

First, the first filter F1 is delivered from the filter supply roll 11a and collected by the filter collection roll 11b. When the first filter F1 becomes unable to be delivered from the filter supply roll 11a any more, both the filter supply and collection roll motors 13a and 13b cease to rotate even if drive current to rotate the filter collection roll motor 13b is increased. Thereupon, the first filter F1 ceases to move, so that the amount of movement of the first filter F1 detected by the encoder 12 becomes zero. Thus, whether or not the delivery of the first filter F1 from the filter supply roll 11a is finished can be determined by monitoring the value of the drive current for the filter collection roll motor 13b and the amount of movement of the first filter F1 detected by the encoder 12.

In moving the first filter F1 taken up by the filter collection roll 11b reversely relative to the filter supply roll 11a, moreover, whether or not the delivery of the first filter F1 from the filter collection roll 11b is finished can be determined by monitoring the value of drive current for the filter supply roll motor 13a and the amount of movement of the first filter F1 detected by the encoder 12.

If the opposite end portions of the first filter F1 are not secured to the filter supply and collection rolls 11a and 11b, a light-shielding sensor or the like may be used to determine the end of the delivery of the first filter F1 from the filter supply or collection roll 11a or 11b. Alternatively, a mark or other distinctive sign may be affixed to a predetermined portion of the first filter F1 such that it can be detected by a suitable device.

Although the backwashing nozzle 14 is shown to be located downstream relative to the filter tank 7 and the reservoir 6 in FIG. 1, it may alternatively be located upstream. Further, the filter supply and collection roll motors 13a and 13b are synchronously driven to move the first filter F1. The first filter F1 can be moved without slackening by synchronously driving the two motors 13a and 13b. If there is no problem of slackening or the like, owing to the configuration of the filtering device or the material of the first filter F1, only the motor on the downstream side of the first filter F1 may be driven to pull and move the first filter F1 with the other motor in free rotation.

Figure 2:
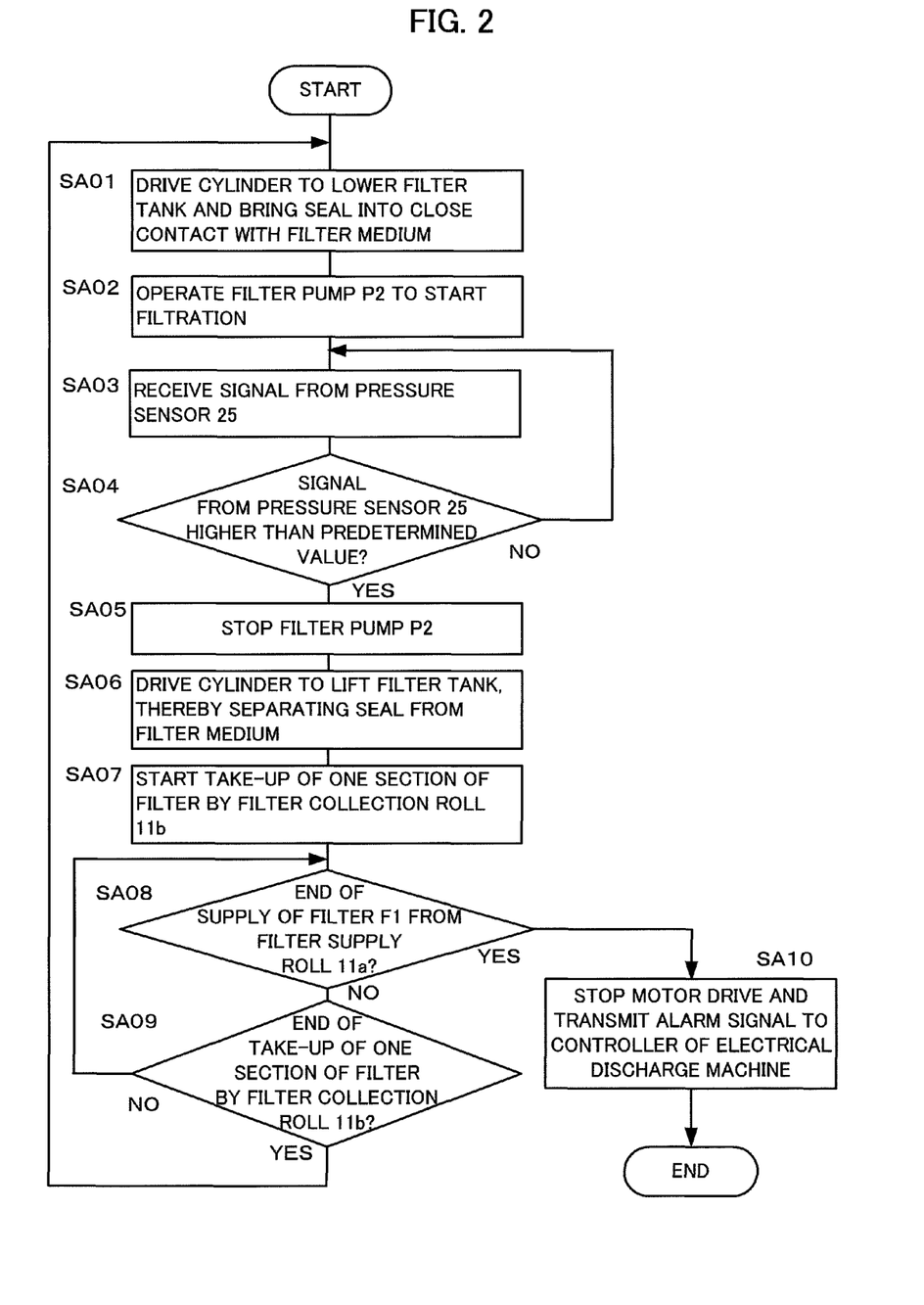
FIG. 2 is a flowchart illustrating a first example of the operation of the working fluid filtering device of FIG. 1.

FIG. 2 is a flowchart illustrating a first example of the operation of the working fluid filtering device of FIG. 1. The filter is not backwashed in the operation of this example. The following is a sequential description of various steps of the operation.

[Step SA01] The cylinder 8 is driven to lower the filter tank 7, thereby bringing the seal 15 into close contact with the filter media.

[Step SA02] The rolled filter pump P2 is operated to start filtration.

[Step SA03] A signal is received from the pressure sensor 25.

[Step SA04] It is determined whether or not the signal from the pressure sensor 25 received in Step SA03 is higher than a predetermined value. If the signal is higher than the predetermined value (YES), the program proceeds to Step SA05. If not (NO), the program returns to Step SA03.

[Step SA05] The rolled filter pump P2 is stopped.

[Step SA06] The cylinder 8 is driven to lift the filter tank 7, thereby separating the seal 15 from the filter media.

[Step SA07] Take-up of one section of the first filter F1 by the filter collection roll 11b is started.

[Step SA08] It is determined whether or not supply of the first filter F1 from the filter supply roll 11a is finished. If the supply is not finished (NO), the program proceeds to Step SA09. If the supply is finished (YES), the program proceeds to Step SA10.

[Step SA09] It is determined whether or not the take-up of one section of the first filter F1 by the filter collection roll 11b is finished. If the take-up is not finished (NO), the program returns to Step SA08. If the take-up is finished (YES), the program returns to Step SA01.

[Step SA10] The drive of the motor for the movement of the first filter F1 is stopped, and an alarm signal is transmitted to the controller of the electrical discharge machine, whereupon this processing ends.

The processing of the above flowchart will now be supplementarily explained. This supplementary explanation is also applicable to the processing of other flowcharts described later.

The working fluid filtering device is stopped after monitoring a stop signal and performing an appropriate ending operation, such as stopping the rolled filter pump P2.

In order to determine the timing for the replacement of the sealing member attached to the working tank 2, moreover, the time required, for example, to drive the cylinder 8 to lower the working tank and bring the seal into close contact with the filter media is integrated. The point in time when a preset time is exceeded by the resulting integration time can be determined to be the life limit of the seal. Thus, the time during which the sealing member has been brought into close contact with the filter media during the current processing is measured by turning on a timer (not shown) the moment the process of Step SA01 is started and turning off the timer the moment the process of Step SA06 is finished. The times during which the sealing member has been brought into close contact with the filter media are measured in the same manner for all cycles of operation. The integration time (close contact time) is obtained by integrating the measured times. In stopping the working fluid filtering device, furthermore, the integration time is stored in advance in the memory of the controller so that it can be used in operating the filtering device next time.

There is also a method in which the life limit of the sealing member is determined based on the frequency (close contact frequency) with which the sealing member is brought into close contact with the filter media. In this method, a counter is used in place of the timer for measuring the integration time. The moment the process of Step SA01 is started, the counter value is incremented by one. The point in time when a preset frequency (number of close contact limit) is exceeded by the counter value can be determined to be the life limit of the seal (see the flowcharts of FIGS. 3A and 3B).

Figure 3A:
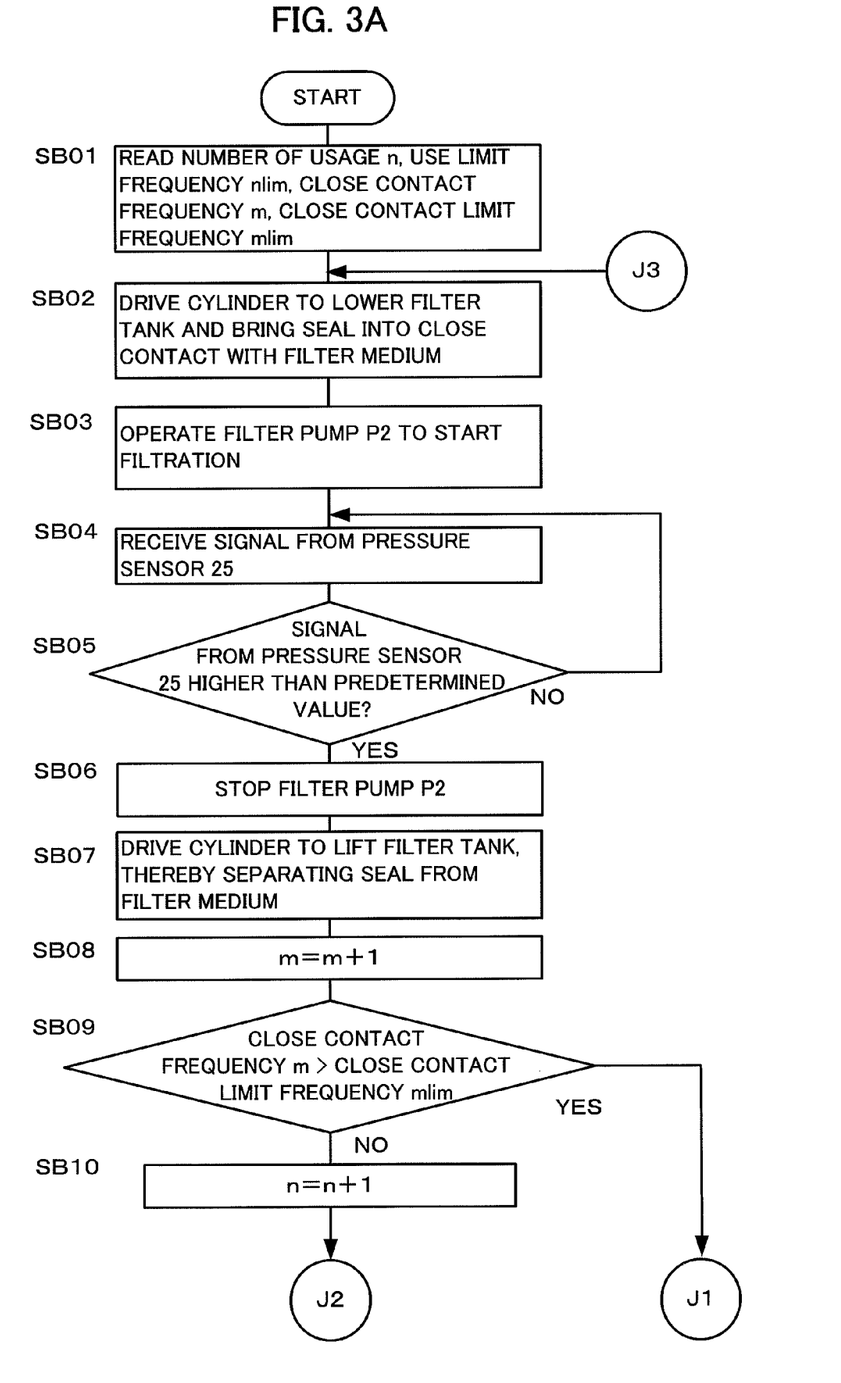
FIGS. 3A and 3B are flowcharts illustrating a second example of the operation of the working fluid filtering device of FIG. 1.
Figure 3B:
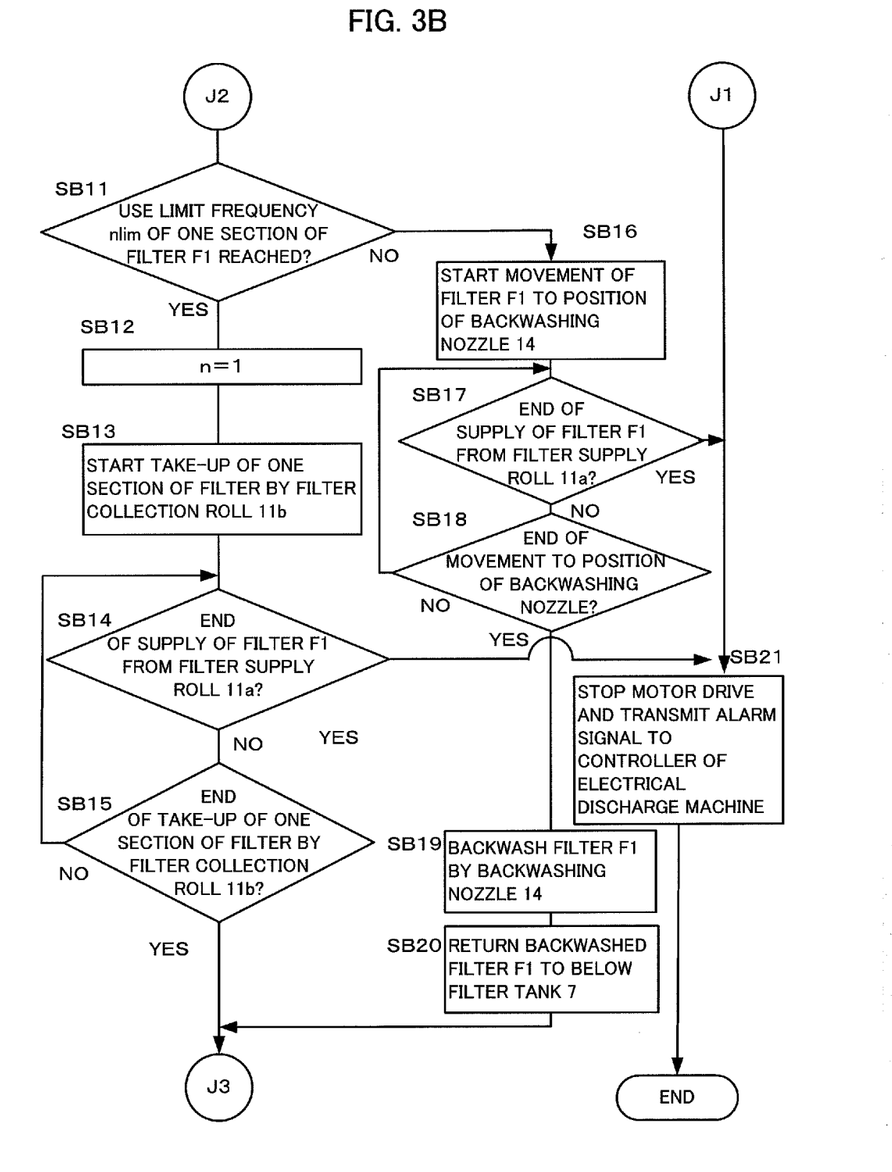

FIGS. 3A and 3B are flowcharts illustrating a second example of the operation of the working fluid filtering device of FIG. 1. In the operation of this example, that part of the first filter F1 used for filtration is backwashed and rewound for use before an ending position for the first filter F1 is reached. The following is a sequential description of various steps of the operation.

[Step SB01] The number of usage n of the first filter F1, the number of usage limit nlim, the number of close contact m of the seal with the filter media, and the number of close contact limit mlim are read. The value of the number of usage n is assumed to be 1 when a new filter roll is used as the filter supply roll 11a. The value of the number of close contact m is assumed to be 1 when the use of the seal 15 is started. The values of the number of usage n and number of close contact m stored in the memory when the working fluid filtering device is stopped in the middle of the use are used when the filtering device is started next time.

[Step SB02] The cylinder 8 is driven to lower the filter tank 7, thereby bringing the seal 15 into close contact with the filter media.

[Step SB03] The rolled filter pump P2 is operated to start filtration.

[Step SB04] A signal is received from the pressure sensor 25.

[Step SB05] It is determined whether or not the signal from the pressure sensor 25 received in Step SB04 is higher than a predetermined value. If the signal is higher than the predetermined value (YES), the program proceeds to Step SB06. If not (NO), the program returns to Step SB04.

[Step SB06] The rolled filter pump P2 is stopped.

[Step SB07] The cylinder 8 is driven to lift the filter tank 7, thereby separating the seal 15 from the filter media.

[Step SB08] The value of the number of close contact m is incremented by one to update the number of close contact m. This value is stored in a nonvolatile memory when the operation of the working fluid filtering device of the electrical discharge machine is stopped.

[Step SB09] It is determined whether or not the number of close contact limit mlim is already reached by the number of close contact m updated in Step SB08. If the number of close contact limit mlim is reached (YES), the program proceeds to Step SB21. If not (NO), the program proceeds to Step SB10.

[Step SB10] The value of the number of usage n is incremented by one to update the number of usage n. This value is stored in the nonvolatile memory when the operation of the working fluid filtering device for the electrical discharge machine is stopped.

[Step SB11] It is determined whether or not the number of usage limit nlim of one section of the first filter F1 is reached. If the use limit is reached (YES), the program proceeds to Step SB12. If not (NO), the program proceeds to Step SB16.

[Step SB12] The value of the number of usage n is restored to 1.

[Step SB13] Take-up of one section of the first filter F1 by the filter collection roll 11b is started.

[Step SB14] It is determined whether or not supply of the first filter F1 from the filter supply roll 11a is finished. If the supply is not finished (NO), the program proceeds to Step SB15. If the supply is finished (YES), the program proceeds to Step SB21.

[Step SB15] It is determined whether or not the take-up of one section of the first filter F1 by the filter collection roll 11b is finished. If the take-up is not finished (NO), the program returns to Step SB14. If the take-up is finished (YES), the program returns to Step SB02.

[Step SB16] Movement of the first filter F1 to the position of the backwashing nozzle 14 is started.

[Step SB17] It is determined whether or not the supply of the first filter F1 from the filter supply roll 11a is finished. If the supply is not finished (NO), the program proceeds to Step SB18. If the supply is finished (YES), the program proceeds to Step SB21.

[Step SB18] It is determined whether or not the movement of the first filter F1 to the position of the backwashing nozzle 14 is finished. If the movement is not finished (NO), the program returns to Step SB17. If the movement is finished (YES), the program proceeds to Step SB19.

[Step SB19] The first filter F1 is backwashed by the backwashing nozzle 14.

[Step SB20] The backwashed first filter F1 is returned to below the filter tank 7, whereupon the program proceeds to Step SB02.

[Step SB21] The drive of the motor for the movement of the first filter F1 is stopped, and an alarm signal is transmitted to the controller of the electrical discharge machine, whereupon this processing ends.

Figure 4A:
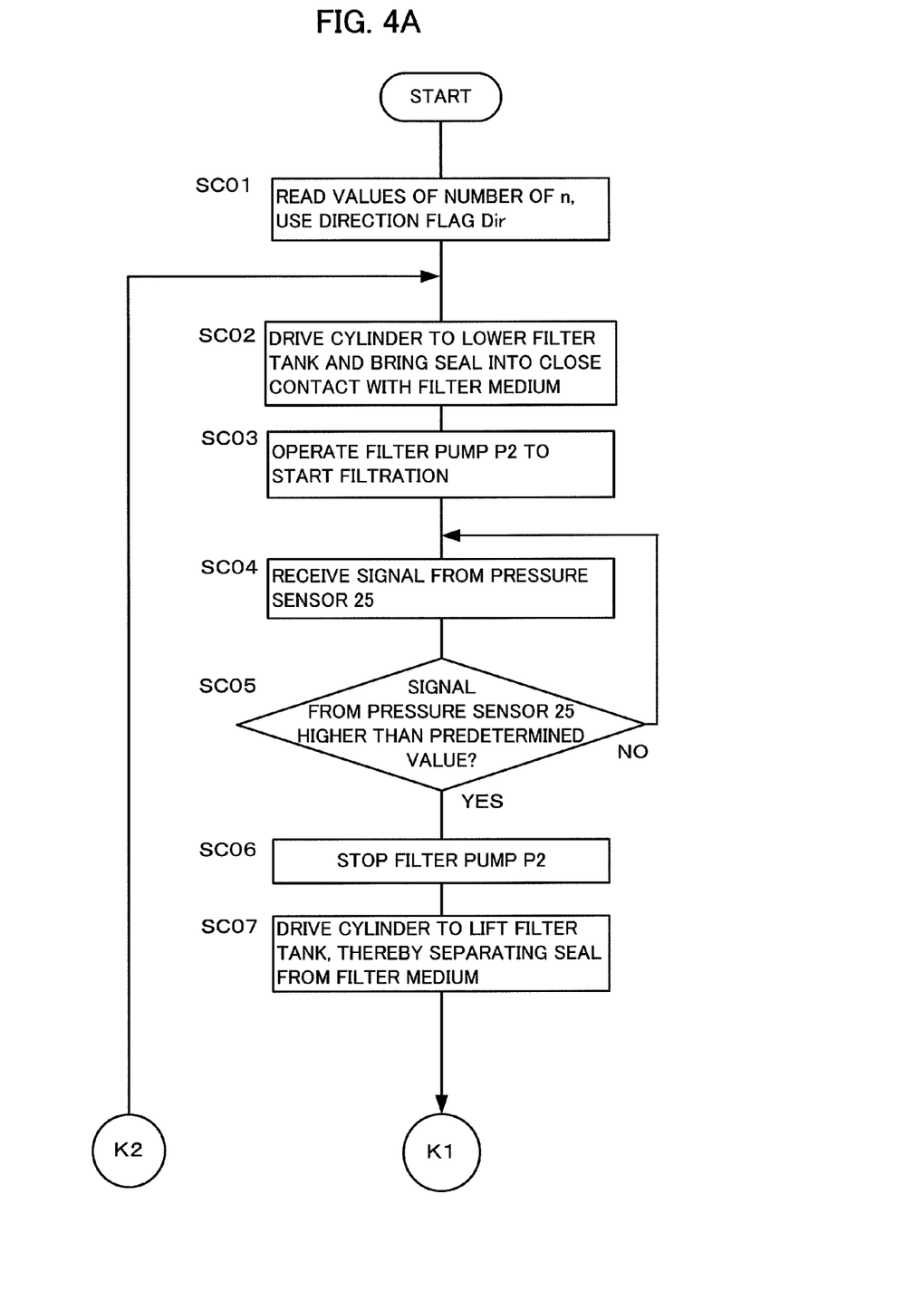
FIGS. 4A and 4B are flowcharts illustrating a third example of the operation of the working fluid filtering device of FIG. 1.
Figure 4B:
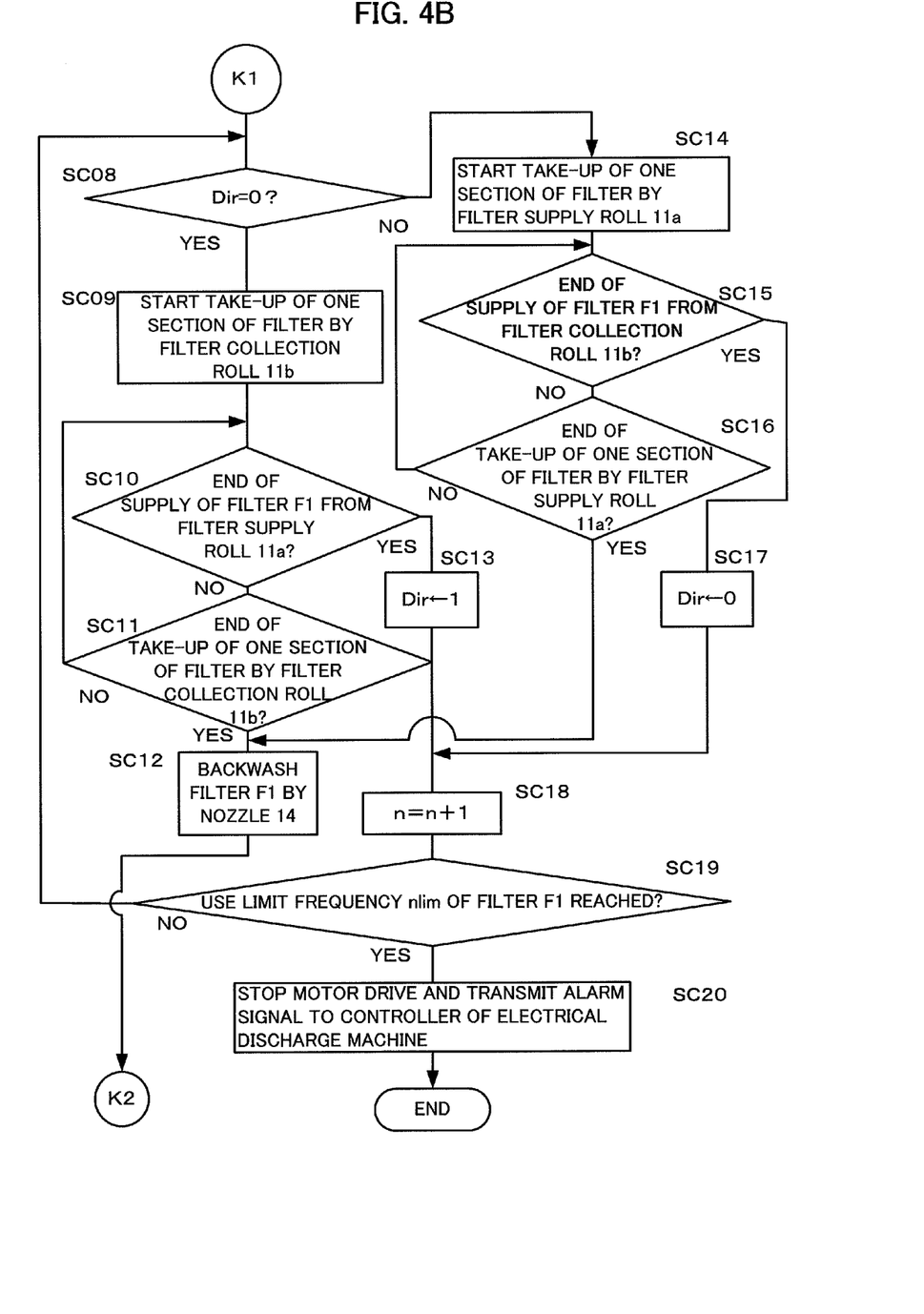

FIGS. 4A and 4B are flowcharts illustrating a third example of the operation of the working fluid filtering device of FIG. 1. In the operation of this example, that part of the first filter F1 used for filtration is rewound for use after the ending position for the first filter F1 is reached. The following is a sequential description of various steps of the operation.

[Step SC01] The value of the number of usage n of the filter F1 is read. This value is assumed to be 1 when a new filter roll is used as the filter supply roll 11a. Further, the use direction flag Dir, which is indicative of the direction of supply of the filter F1, is read. For the use direction flag Dir used in the present specification, forward and reverse rotation directions are given by "0" and "1", respectively, and the initial value of this flag is set to 0 (forward rotation direction).

[Step SC02] The cylinder 8 is driven to lower the filter tank 7, thereby bringing the seal 15 into close contact with the filter media.

[Step SC03] The rolled filter pump P2 is operated to start filtration.

[Step SC04] A signal is received from the pressure sensor 25.

[Step SC05] It is determined whether or not the signal from the pressure sensor 25 received in Step SC04 is higher than a predetermined value. If the signal is higher than the predetermined value (YES), the program proceeds to Step SC06. If not (NO), the program returns to Step SC04.

[Step SC06] The rolled filter pump P2 is stopped.

[Step SC07] The cylinder 8 is driven to lift the filter tank 7, thereby separating the seal 15 from the filter media.

[Step SC08] It is determined whether or not the use direction flag Dir is 0 (forward rotation direction). If the flag Dir is 0 (YES), the program proceeds to Step SC09. If not (NO), that is, if the use direction flag Dir is 1 (reverse rotation direction), the program proceeds to Step SC14.

[Step SC09] Take-up of one section of the first filter F1 by the filter collection roll 11b is started.

[Step SC10] It is determined whether or not supply of the first filter F1 from the filter supply roll 11a is finished. If the supply is not finished (NO), the program proceeds to Step SC11. If the supply is finished (YES), the program proceeds to Step SC13.

[Step SC11] It is determined whether or not the take-up of one section of the first filter F1 by the filter collection roll 11b is finished. If the take-up is not finished (NO), the program returns to Step SC10. If the take-up is finished (YES), the program proceeds to Step SC12.

[Step SC12] The first filter F1 is backwashed by the backwashing nozzle 14.

[Step SC13] The use direction flag Dir is set to 1 (reverse rotation direction), whereupon the program proceeds to Step SC18.

[Step SC14] Take-up of one section of the first filter F1 by the filter supply roll 11a is started.

[Step SC15] It is determined whether or not supply of the first filter F1 from the filter collection roll 11b is finished. If the supply is not finished (NO), the program proceeds to Step SC16. If the supply is finished (YES), the program proceeds to Step SC17.

[Step SC16] It is determined whether or not the take-up of one section of the first filter F1 by the filter supply roll 11a is finished. If the take-up is not finished (NO), the program returns to Step SC15. If the take-up is finished (YES), the program proceeds to Step SC12.

[Step SC17] The use direction flag Dir is set to 0 (forward rotation direction), whereupon the program proceeds to Step SC18.

[Step SC18] The value of the number of usage n is incremented by one to update the number of usage n.

[Step SC19] It is determined whether or not the number of usage limit nlim of the first filter F1 is reached. If the use limit is not reached (NO), the program returns to Step SC08. If the use limit is reached (YES), the program proceeds to Step SC20.

[Step SC20] The drive of the motor for the movement of the first filter F1 is stopped, and an alarm signal is transmitted to the controller of the electrical discharge machine, whereupon this processing ends.

According to the working fluid filtering device for an electrical discharge machine of the present invention, the filter media that filters fine metal sludge of a workpiece discharged during machining is disposed in a roll such that the filter media can be moved without damaging either the working fluid filtering device or the filter media.

The working fluid filtering device for an electrical discharge machine according to the present invention may be used not only as an independent filter but as a sub-filter (or an auxiliary filter) that can extend the life of the main filter.

The present invention is applicable to any of working fluid filtering devices for an electrical discharge machine, including one that introduces a filtered working fluid into a reservoir, one that introduces a filtered working fluid into a clean fluid tank, one that introduces a filtered working fluid into a contaminated fluid tank (to achieve coarse filtering to remove only sludge and the like in this case), one that introduces a filtered working fluid into a working tank, one that introduces a filtered working fluid into a supply route, and one that introduces a filtered working fluid into two or more of those tanks or route. The present invention is also applicable to working fluid filtering devices for an electrical discharge machine, including one that introduces a working fluid in a reservoir into a clean fluid tank, one that introduces a working fluid in a reservoir into a contaminated fluid tank, one that introduces a working fluid in a reservoir into a working tank, one that introduces a working fluid in a reservoir into a supply route, and one that introduces a working fluid in a reservoir into two or more of those tanks or route.

The invention claimed is:

1. A working fluid filtering device for an electrical discharge machine, which includes a working tank comprising therein an electric discharge machining unit in which a workpiece is electrical-discharge-machined by an electrode, a contaminated fluid tank in which a working fluid from the working tank is collected and pooled, and a filter tank formed with an opening at a bottom portion thereof, wherein a filter is brought into contact with the bottom portion of the filter tank and the working fluid from the contaminated fluid tank is filled into a space defined by the filter tank and the filter and is filtered, the working fluid filtering device comprising:

a filter supply roll actuator configured to rotate a filter supply roll which is a rolled form of the filter for working fluid filtration;

a filter collection roll actuator configured to rotate a filter collection roll which collects the filter;

a movement amount detection unit configured to detect an amount of movement of the filter;

an actuator for close contact configured to bring a seal disposed on the filter tank into close contact with the filter and separate the seal from the filter;

a pressure detection unit configured to detect a pressure of the working fluid in the filter tank;

a nozzle configured to wash the filter, the nozzle disposed upstream or downstream relative to the filter tank; and a control unit configured to perform control such that the actuator for close contact is driven to bring the seal into close contact with the filter, the working fluid is filtered with the filter tank being sealed, and when a predetermined value is exceeded by the pressure of the working fluid detected by the pressure detection unit, the actuator for close contact is driven to separate the seal and the filter from each other, and the filter supply roll actuator and the filter collection roll actuator are synchronously driven in the direction of supply of the filter to move the filter a predetermined distance, thereby washing the filter, driving the actuator for close contact to bring the seal into close contact with the filter, and changing a rotation direction of a filter collection roll and that of a filter supply roll when all of the filter is collected by the filter collection roll and the filter supply roll.

2. The working fluid filtering device for an electrical discharge machine according to claim 1, further comprising a time integration unit configured to integrate a time required to bring the seal into close contact with the filter by means of the actuator for close contact, wherein when a predetermined time is exceeded by the time integrated by the time integration unit, a warning alarm indicative of a life limit of the seal is issued.

3. The working fluid filtering device for an electrical discharge machine according to claim 1, further comprising a frequency integration unit configured to integrate a frequency required to bring the seal into close contact with the filter by means of the actuator for close contact, wherein when a predetermined frequency is exceeded by the frequency integrated by the frequency integration unit, a warning alarm indicative of a life limit of the seal is issued.

4. The working fluid filtering device for an electrical discharge machine according to claim 1, wherein said control unit is configured to change the rotation directions of the filter collection roll and the filter supply roll only when all of the filter is collected by one of the filter collection roll and the filter supply roll.

5. The working fluid filtering device for an electrical discharge machine according to claim 1, further comprising:

a storage configured to store a number of usage of the filter, wherein the number of usage is configured to be incremented by one when said control unit changes the rotation directions of the filter collection roll and the filter supply roll, and an alarm signal is configured to be transmitted to a controller of the electrical discharge machine when the number of usage of the filter reaches a predetermined limit.

6. The working fluid filtering device for an electrical discharge machine according to claim 1, wherein said pressure detection unit comprises a pressure switch.

* * * * *